Feb. 8, 1949.  E. J. BAUMGARDNER  2,461,024
COUPLING DEVICE
Filed Dec. 12, 1944

INVENTOR.
EARL J. BAUMGARDNER
BY
Charles S. Penfold
ATTORNEY

Patented Feb. 8, 1949

2,461,024

UNITED STATES PATENT OFFICE 2,461,024

COUPLING DEVICE

Earl J. Baumgardner, Marion, Iowa, assignor to H. A. Douglas Mfg. Co., Bronson, Mich., a corporation of Michigan Application December 12, 1944, Serial No. 567,814

16 Claims. (Cl. 285—173)

This invention relates generally to coupling devices and more particularly is directed to a fitting or plug device, secured to the extremity of a conduit, such as the conduit of a vacuum cleaner, whereby the hose may be detachably connected to the cleaner.

One important object of the invention is to provide a fitting which will allow the conduit or hose to rotate freely with respect to the fitting when the latter is connected to the cleaner. This arrangement has proven desirable because twisting, coiling, and kinking of the conduit is prevented when an accessory such as a floor nozzle, connected to the opposite end of the conduit is being used.

One particular object is to provide a fitting which may be easily and quickly detachably connected to the cleaner, and one whereby the air passing through the conduit will not escape through the fitting; in other words, an uninterrupted continuous passage is provided between the interior of the conduit and the interior of the cleaner.

Another object is to provide latch means for detachably connecting the plug to the cleaner and resilient means for detachably holding the latch means to the plug.

A further object is to provide a fitting which consists of very few parts which may be easily and quickly assembled into a compact unit on a production basis.

A still further object of the invention is to provide a plug or fitting which is provided with a manually operable slip ring for releasing the latching means associated with the plug.

Other objects and advantages of the invention will be apparent after reading the description hereinafter set forth in connection with the drawing annexed hereto.

Figure 1:
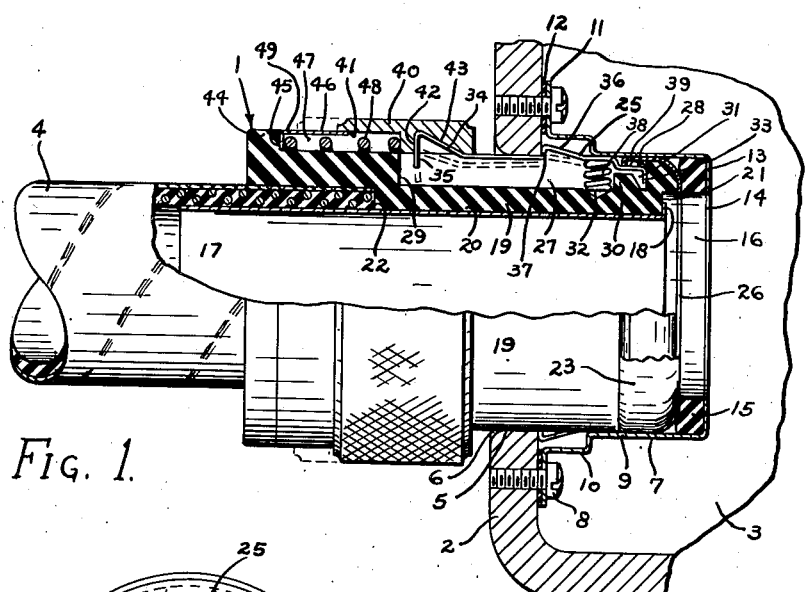
Figure 1 shows the conduit fitting secured or assembled with a vacuum cleaner, with portions of the assembly broken away to clearly illustrate the details of construction.
Figure 2:
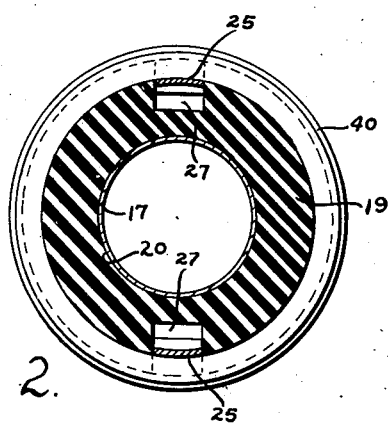
Figure 2 is a transverse section taken through an appropriate part of the coupling for the purpose of showing additional details of construction.

Referring more in detail to the structure illustrated, numeral 1 generally designates the fitting or plug detachably connected to the end wall 2 of a vacuum cleaner housing 3, and 4 is a conduit or hose rotatably associated with the fitting.

The end wall of the vacuum cleaner housing is provided with a circular opening 5 through which the fitting is projected. The opening is preferably chamfered at 6 whereby to assist in piloting the plug into the opening. A receptacle or socket 7 for the plug is secured to the inner side of the end wall 2 by a plurality of screws 8. The receptacle includes a cylindrical portion 9 serving as a bearing or support for the entrance part of the plug, an enlarged annular portion 10 which forms a space within which portions of the latches may operate, and a radially extending flange 11. A gasket 12 is disposed between the flange 11 and the inner side of the end wall of the cleaner so as to seal off and prevent any air from being drawn into the cleaner other than through the passage desired. The receptacle 7 is also provided with an end wall 13 provided with an aperture 14. A resilient washer 15 is disposed in the receptacle 7 and preferably cemented to the end wall 13 to serve as a yieldable abutment for the inner end or extremity of the plug. The washer 15 is provided with an aperture 16 corresponding to the aperture 14.

The conduit is of conventional construction. One extremity of an elongated tube 17 is firmly secured against rotation in the conduit 4 and its other extremity extends beyond the end of the conduit and provides a fixed mounting or support about which the plug 1 may rotate. The free end of the tube 17 is preferably provided with a radial locking flange 18.

The plug preferably includes a tubular cylindrical body 19 constructed from some desirable material, such as pyroxlin plastic or phenolic condensate. The body is provided with a round opening 20 through which the tube 17 extends whereby to rotatably mount the plug. The end of the body which first enters the receptacle 7 of the cleaner is preferably recessed to provide a shoulder 21 which is engaged by the radial flange 18 of the tube for holding the plug connected to the conduit and against axial movement in one direction. The opposite or trailing end of the body is also preferably recessed to provide a shoulder 22 which is engaged by the end of the conduit whereby to hold the plug against limited axial movement in an opposite direction. The end of the conduit being seated in the last mentioned recess is well protected and serves to conceal any end which may not have been cut or severed as intended. Also, any frayed ends of the fabric covering on the conduit are concealed from view.

The entrance end of the body 19 is reduced so as to provide a cylindrical portion of a diameter slightly less than the diameter of the remainder of the body as clearly illustrated in Figure 1. A cup shaped cap member 23 is snugly fitted over the reduced portion and may be permanently secured in place by flaring or indenting the edge of the cap inwardly into a groove 24 or into the body. The ferrule protects the entrance end of the body 19 from damage or injury and also serves as a locking ring assisting to hold the latches 25 in position. The cap is slightly rounded so as to assist in piloting the plug into the receptacle 7. The cap is also provided with an aperture 26 corresponding in size to the apertures 14 and 16 in the receptacle or socket, and washer 15. Since all of the apertures are of the same diameter the stream of air that is drawn into the cleaner is not interrupted.

The body 19 is provided with a pair of diametrically disposed longitudinally extending shallow channels or pockets 27, generally rectangular in cross section. The end walls 28 and 29 of each channel terminate short of the ends of the plug. The bottom wall adjacent one end of the channel is provided with an upstanding integral lug portion 30 spaced from the end wall 28 to provide a recess 31. The bottom wall is also provided with a round depression 32 adjacent the lug 30.

A resilient latch 25 is disposed in each of the channels 27. One end of each latch is provided with a laterally bent tongue portion 33 which is caught in the recess 31 and its opposite end is provided with an inclined portion 34 and a down turned stop portion 35 located near the end wall 29 of the channel. Each latch is also provided with a catch consisting of a combined sloping portion 36 and a shoulder portion 37 located intermediate the extremities of the latch. The catches and the inclined portion 34 and a part of the stop portion 35 normally project outwardly with reference to the channel.

Figure 4:
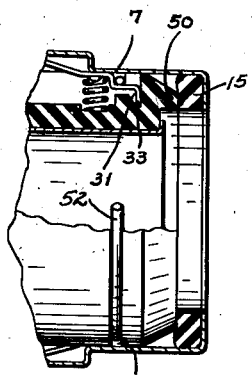
Figure 4 is another modification to which the invention is susceptible.
Figure 3:
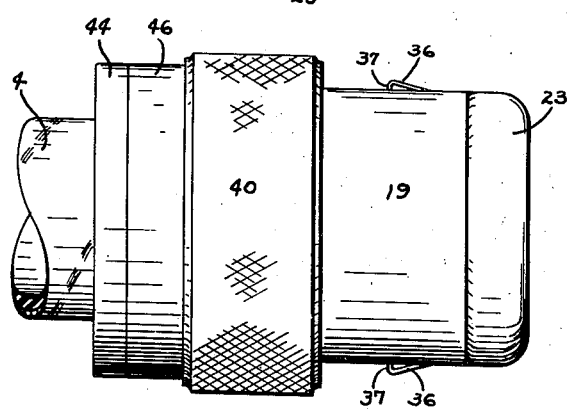
Figure 3 is a side view of the coupling.

A helical spring 38 is preferably disposed in each of the channels at a desirable location with one end of each spring being seated in the depression 32 and its opposite end engaging the latch at a point intermediate the lateral tongue 33 and the sloping portion 36 whereby to yieldingly urge the major portion of the latch outwardly. Each latch may be provided with a raised portion as illustrated in Figure 4 whereby to assist in holding the inner or said opposite end of each spring on the latch. A projection 39 is preferably provided adjacent the tongue 33 of each latch to engage the inner curved surface of the cap member 23 to compensate for the curvature of the cap and thereby allow the latches to more completely laterally adjust themselves with respect to the marginal edges of the opening 5 in the end wall of the vacuum cleaner housing, particularly when the plug is being connected to the cleaner.

As stated above one important object of the invention is to provide manually operated means whereby the latches may be operated for releasing or disconnecting the plug from the cleaner. The operating means includes an annular ring 40 slidable longitudinally on the body 19. This ring is preferably knurled on its outer surface so as to prevent slippage when the ring is grasped by the hand. It is also provided with an annular recess 41 and an internal groove which receives the inclined portions 34 and the stop portions 35 of the latches. More specifically, the groove includes a combined shoulder portion 42 and an inclined cam portion 43 which are more or less engaged by the portions 35 and 34 of the latches, respectively. The body 19 is provided with an enlargement 44 which forms an abutment 45. A band 46 of an outside diameter corresponding to the outside diameter of the enlargement 44 and the diameter of the recess 41 is disposed in concentric relation to the elongated cylindrical portion of the body whereby to provide an annular space 47 in conjunction with the recess 41 in the ring 40. An enlarged helical spring 48 is disposed in the space 47 with one end engaging the bottom of the recess 41 and its other end engaging a radially extending annular flange 49 provided on the band 46 to maintain the flange in engagement with the abutment 45. The recess 41 and the band 46 are of a size to conceal the enlarged helical spring 48 from view. The band 46 also serves as a bearing to support a portion of the ring member 40. The ring 40 and band 46 are thus rotatably mounted with respect to each other and to the body 19.

In the modification of the invention illustrated in Figure 4, the cap member 23 is omitted so that the end 50 of the body 19 of a plug is adapted to engage the resilient washer 15 disposed in the receptacle 7. Moreover, the body is preferably provided with a groove 51 which receives a split annular wire ring 52 which resiliently presses or urges the tongue 33 of each latch into its respective recess 31 in the body. In view of the fact that the catches are constructed of resilient material and are resiliently supported by the springs 38 and held in place by the resilient or flexible ring 52, the latches are sensitive and yet very positive and efficient in action.

In view of the foregoing, it will be evident that to connect the plug to the cleaner it is merely necessary to grasp either the conduit or plug or both and force the plug into the opening 5 of the cleaner to cause the sloping portions 36 of the latches to be moved inwardly as indicated by the dotted lines in Figure 1 and when the entrance end or more specifically the cap member 23 engages and compresses the resilient washer 15 seated in the receptacle 7 to a certain extent the latches will snap outwardly so that the shoulder portions 37 thereof will abut the inner side of the end wall of the housing. When the plug is thus connected to the cleaner the conduit 4 and tube 17 forming a part thereof may freely rotate with respect to the body of the plug and to the cleaner. To release the plug from the cleaner it is merely necessary to grasp the ring 40 and pull it outwardly whereupon the inclined cam portion 43 of the ring will press the inclined portions 34 and other portions of other latches inwardly to an extent whereby the shoulder portions 37 of the latches become disengaged from the wall of the cleaner. The resilient washer 15 tends to throw the plug outwardly to some extent as it is being disconnected from the cleaner. It will also be evident that when the plug has been disconnected from the cleaner an adjustment of the ring 40 will take place causing the ring 40 to slide along the body 19 and the band 46 until the stop portion 35 of each latch engages the shoulder 42 on the ring to predetermine the position of the ring and limit forward movement thereof. In other words, the ring is normally urged by the enlarged helical spring 48 to a position whereby the shoulder 42 engages the stop 35 of the latch. Furthermore, it will be apparent that the bottom wall of the recess 41 is substantially in alignment with the plane of the end wall 29 of each channel 27 so that the spring does not cross over either of the channels 27. Still further it is to be understood that although the conduit is primarily adapted for rotation with respect to the plug when the plug is connected to the vacuum cleaner, the plug may also rotate to some extent, particularly in a situation where the washer 15 is constructed of some desirable fibrous material which will allow the cap member or the entrance end of the plug to rotate against the washer. Also, if for any reason the body 19 does not rotate freely on the tube 17 the plug will rotate with respect to the cleaner, in which event the shoulder portions of the latches will slidably bear against the inner side of the end wall 2 of the vacuum cleaner housing. It will also be manifest that in the modification of the invention provision is made whereby to resiliently hold the latches in place.

Having thus described my invention, it is obvious that various other modifications may be made in the same without departing from the spirit of the invention; and, therefore, I do not wish to be understood as limiting myself to the exact forms, constructions, arrangements, and combinations of parts herein shown and described.

I claim:

1. In a device of the kind described, a conduit, a tube having one extremity anchored in said conduit and its other extremity extending free beyond the end of said conduit, a flange provided adjacent the free end of said tube, a non-metallic body rotatably mounted on said tube, said body being provided with a recess at one extremity receiving the end of a conduit and a recess at its other extremity receving the flange of the tube whereby to hold said body against axial movement with respect to said tube, a recess provided in said body and elongated latch means disposed in said recess, means for securing one end of the latch to the body, and means movable with respect to the body cooperable with the opposite extremity of the latch means for operating the latch means.

2. In a device of the kind described, a conduit, a non-metallic body rotatably mounted with respect to said conduit, a recess provided in said body, elongated latch means disposed in said recess, means for securing one extremity of said latch means in said recess so that said latch means may pivot with respect to said recess, and means rotatable and slidable with respect to said body cooperable with the opposite extremity of said latch means for operating said latch means.

3. In a device of the kind described, a conduit, a relatively thick walled body adapted for entry into an opening rotatably mounted with respect to said conduit, latch means mounted on and substantially within the wall of said body, means for holding the latch means to said body, and means rotatable with respect to the latch means for operating said latch means.

4. In combination, a socket, a conduit provided with a plug, said socket and said plug being so constructed and arranged that same may be detachably coupled together by means projecting through one into the other, resilient means disposed in said socket acting to urge said plug outwardly with respect to said socket when said plug is being uncoupled from said socket, and means slidable on the plug for actuating the projecting means.

5. A plug device adapted to be connected to the end of a conduit, said plug device including, a tubular part having a portion extending beyond the end of the conduit, a relatively thick walled body part rotatably mounted on the portion of said tubular part, latch means disposed substantially within the wall of said body part, and means carried by said body for operating said latch means.

6. A plug device adapted to be connected to the end of a conduit, said plug device including, a tubular part, a thick walled body part rotatably mounted on said tubular part, latch means disposed substantially within the wall of said body part, means carried by said body for operating said latch means, and separate resilient means acting on said operating means for maintaining said operating means in a predetermined position with respect to said latch means.

7. A plug device adapted to be connected to the end of a conduit, said plug device including, a tubular part having a portion for disposition in the conduit and a bearing portion, a thick walled body part rotatably mounted on said bearing portion, latch means disposed substantially within the wall of said body part, and means for operating said latch means, the position of said operating means being predetermined in part by said latch means.

8. A plug device adapted for connection with a conduit, said plug device including, a thick walled body part adapted to be rotatably mounted with respect to the conduit, latch means disposed substantially within the wall of said body part, rotatable and slidable means for operating said latch means, and resilient means pressing said operating means against said latch means.

9. A plug device adapted for connection with a conduit, said plug device including, a thick walled body part adapted to be rotatably mounted with respect to the conduit, latch means disposed substantially within the wall of said body part, rotatable and slidable means for operating said latch means, resilient means pressing said operating means against said latch means, and means for covering said resilient means providing a bearing for at least a part of said operating means.

10. A plug device including, a body provided with a thickened wall portion having a recess therein, elongated latch means disposed substantially entirely within the confines of said recess in said body, resilient means for holding one extremity of said latch means with respect to said body, and means rotatably carried by said body for operating said latch means.

11. A plug device including, a non-metallic body part having a recess, latch means seated in said recess, and resilient means surrounding the body part assisting to detachably hold said latch means with respect to said body part.

12. In a device of the kind decribed, a conduit, a tube having one extremity anchored to said conduit and its other extremity extending free beyond the end of said conduit, stop means provided adjacent the free end of said tube, a body rotatably mounted on said tube, said body being provided with a recess at one extremity receiving the end of the conduit and abutment means at its other extremity engaging said stop means whereby to hold said body against axial movement with respect to said tube, a recess provided in said body, latch means disposed in said recess, and means movable with respect to the body cooperable with a part of the latch means for operating the latch means.

13. In a device of the kind described, a nonmetallic body adapted to be rotatably carried by a conduit, a recess in said body, latch means in said recess, means for holding the latch means in said recess whereby said latch means may pivot, and means slidable with respect to said body cooperable with said latch means for operating the same.

14. A plug adapted to be connected to the end of a conduit, a recess in said plug, latch means disposed in said recess, and a split ring actable on said latch means for holding the same in said recess by pressure exerted in a direction toward the longitudinal axis of the body.

15. A plug adapted to be connected to the end of a conduit, said plug having a thickened wall portion provided with an elongated exterior recess, latch means seated in said recess, a ferrule covering said recess and latch means, an opening provided in said ferrule through which a holding portion of the latch means extends, and means slidable on the plug for operating the latch means.

16. In a device of the kind described, a conduit, a tube having one extremity anchored to said conduit and its other extremity extending free beyond the end of said conduit, stop means provided adjacent the free end of said tube, a body rotatably mounted on said tube, said body at one extremity engaging the end of the conduit and abutment means at its other extremity engaging said stop means whereby to hold said body against axial movement with respect to said tube, a recess provided in said body, latch means disposed in said recess, and means movable with respect to the body cooperable with a part of the latch means for operating the latch means.

EARL J. BAUMGARDNER.

REFERENCES CITED

The following references are of record in the file of this patent:

UNITED STATES PATENTS

| Number | Name | Date |
|---|---|---|
| 2,004,967 | Williams | June 18, 1935 |
| 2,102,802 | Lofgren | Dec. 21, 1937 |
| 2,150,765 | Forsberg | Mar. 14, 1939 |
| 2,222,018 | Bruce | Nov. 19, 1940 |

FOREIGN PATENTS

| Number | Country | Date |
|---|---|---|
| 847,163 | France | June 26, 1939 |